(12) United States Patent
Lee et al.

(10) Patent No.: US 7,582,721 B2
(45) Date of Patent: *Sep. 1, 2009

(54) TWO STEP PREPARATION OF RANDOM POLYOXADIAZOLE COPOLYMER AND ARTICLES RESULTING THEREFROM

(75) Inventors: Kiu-Seung Lee, Midlothian, VA (US); Harry Lee Smith, Jr., Richmond, VA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 47 days.

This patent is subject to a terminal disclaimer.

(21) Appl. No.: 11/414,959

(22) Filed: May 1, 2006

(65) Prior Publication Data

US 2007/0255037 A1  Nov. 1, 2007

(51) Int. Cl.
*C08G 63/02* (2006.01)
*C08G 63/00* (2006.01)

(52) U.S. Cl. .................. 528/272; 264/184; 521/128; 521/180; 521/183; 521/189; 521/77; 524/104; 524/173; 525/419; 528/271; 528/332; 528/362; 528/363

(58) Field of Classification Search .......... 264/184; 521/128, 180, 183, 189, 77; 524/104, 173; 525/419; 528/271, 272, 293, 332, 362, 363

See application file for complete search history.

(56) References Cited

U.S. PATENT DOCUMENTS 3,642,708 A * 2/1972 Sekiguchi .............. 525/419
4,115,503 A * 9/1978 Bach ..................... 264/184
4,500,701 A * 2/1985 Stephens ................ 528/363

FOREIGN PATENT DOCUMENTS

| DE | 36 20 022 A1 | 12/1987 |
| DE | 296 277 A5 | 11/1991 |
| GB | 1252508 | * 11/1971 |
| GB | 1 303 409 | 1/1973 |
| GB | 1527352 | * 10/1978 |

OTHER PUBLICATIONS

Iwakura et al., "Poly-1,3,4-oxadiazoles. I. Polyphenylene-1,3,4-oxadiazoles", 1965, Journal of Polymer Science: Part A, vol. 3, pp. 46, 48.*
Imai, "Direct fiber formation and Fiber Propertis of Aromatic Polyoxadiazoles", 1970, Journal of Applied Polymer Science, vol. 14, pp. 226.*

\* cited by examiner

*Primary Examiner*—Porfirio Nazario-Gonzalez
*Assistant Examiner*—Yate' K Cutliff

(57) ABSTRACT

In a preparation of random polyoxadiazole copolymer by reaction of a mixture of oleum, hydrazine sulfate, terephthalic acid, and isophthalic acid, the improvement requires the addition of oleum in more than one step.

13 Claims, No Drawings

TWO STEP PREPARATION OF RANDOM POLYOXADIAZOLE COPOLYMER AND ARTICLES RESULTING THEREFROM

BACKGROUND OF THE INVENTION

The present invention is directed to preparation of a polyoxadiazole copolymer and resulting articles.

British GB 1 303 409 discloses preparation of poly-1,3,4oxadiazoles by reacting para-oriented carboxylic acids with hydrazine salts in chlorosulphonic acid at a temperature above 50 degrees Celsius.

German DE 36 20 022 A1 discloses preparation of polyphenylene-1,3,4-oxadiazole polymers, which are lightly colored or colorless with a low content of hydrazine functional groups.

German DD 296 277A5 discloses preparation of 1,3,4-oxadiazoles by reacting carboxylic acids with hydrazine or hydrazine salts, carboxylic acids with carboxylic acid hydrazides, diacyl hydrazides, dicarboxylic acids, and/or carboxylic acid derivatives with hydrazine and/or hydrazine salts in sulfuric acid and in a condensation agent.

A need is present for an alternate process of preparing a polyoxadiazole copolymer and article resulting therefrom.

SUMMARY OF THE INVENTION

The present invention is directed to a process of preparation of a random copolyoxadiazole polymer by reaction of a mixture of oleum, hydrazine sulfate, terephthalic acid, and at least one additional para-oriented aromatic diacid with the oleum added in at least two separate steps.

In a first reaction step, the amount of oleum present with hydrazine sulfate and the terephthalic acid and additional acids is insufficient to form the final random polyoxadiazole copolymer. Only in a subsequent step is the final amount of oleum added to complete the reaction procedure.

The random polyoxadiazole copolymer formed in a multistep oleum addition preferably has a low solution viscosity at high polymer concentration such as a viscosity range which provides stable extrusion into a resulting article. An example of a viscosity range is 750-2000 poise at a copolymer concentration from 8 to 15 weight percent. It is considered that the resulting copolymer has improved spinning characteristics due to the higher concentration of solids in the spinning solution.

DETAILED DESCRIPTION OF THE INVENTION

In an initial first step an insufficient amount of oleum, i.e. sulfur trioxide ($SO_3$) is present in the reaction mixture calculated on the basis of the remaining components of hydrazine sulfate, terephthalic acid, and at least one additional para-oriented aromatic diacid in formation of the polyoxadiazole copolymer. The amount of sulfur trioxide ($SO_3$) from the oleum is present in a first reaction step in an amount not greater than 3 molar equivalents based on the number of moles of hydrazine. Generally, the amount of sulfur trioxide ($SO_3$) is present in a range of 2 molar equivalents to 3 molar equivalents on a basis of the number of moles of hydrazine. In comparison the amount of sulfur trioxide to complete the reaction is generally in the range of 5 to 6 molar equivalents of sulfur trioxide ($SO_3$) based on moles of hydrazine.

Suitable additional para-oriented aromatic diacids include but are not limited to 4,4'-oxybis(benzoic acid), 4,4'-azobenzenedicarboxylic acid, 4,4'-stilbenedicarboxylic acid, 1,4'-phenylenediacrylic acid, 2,6-naphthalene dicarboxylic acid, and 4,4'-biphenyldicarboxylic acid.

The temperature at which the remaining components of hydrazine sulfate, terephthalic acid, and additional para-oriented aromatic diacid(s) are mixed to form the reaction solution can vary which in turn will determine the degree of randomness of the final copolymer.

Typically hydrazine sulfate expressed as hydrazine is present in an amount from 95 to 100 mole percent in comparison to the total number of moles of terephthalic acid and additional para-oriented aromatic diacid(s). For environmental reasons an excess of hydrazine is not desirable due to reactivity and environmental toxicity of hydrazine. Other researchers have used an excess of hydrazine to achieve high inherent viscosity with an example being Acta Polymer, 43, 343-347 (1992) FIG. 1.

Typically, the amounts of terephthalic acid and additional para-oriented aromatic diacid(s) are present in an amount from 65 to 90 mole percent and 35 to 10 mole percent respectively, based on the total number of moles of the two acids.

The components of hydrazine sulfate, terephthalic acid, and additional para-oriented aromatic diacid(s) typically are combined in solid form and thoroughly mixed prior to the first addition of oleum in an amount not greater than 3 molar equivalents of sulfur trioxide ($SO_3$) based on the moles of hydrazine.

It is preferable to control the temperature of the oleum until all the reagents have dissolved. The temperature preferably should be maintained not greater than 50 degrees Celsius, more preferably, not greater than 35 degrees Celsius. An example of addition and dissolution is at about 25 degrees Celsius over the course of about 10 to 20 minutes. It is believed that by maintaining this temperature that a more random distribution of repeat units is achieved in the final polymer chain which results in improved properties.

Following dissolution of all components, the solution typically is heated in a range from 100 to 150 degrees Celsius. Preferably the solution is heated in a range from 110 to 130 degrees Celsius. The solution conventionally is stirred until the viscosity of the solution plateaus. Typically, the viscosity maxima occurs after about 30 to 75 minutes of heating. To this solution is added additional oleum containing about 2 equivalents of $SO_3$ based on the number of moles of hydrazine. Three equivalents of $SO_3$ need to react to complete the reaction. Typically about 5 equivalents are used due to the vapor phase equilibrium of $SO_3$ over the reaction. Typically, the solution is stirred and heated in a range from 100 to 150 degrees Celsius, preferably in a range from 110 to 140 degrees Celsius until a second viscosity plateau is reached. Typically, the second viscosity maxima occurs after about 80 to 150 minutes of heating. The solution then is cooled to room temperature and the polymer precipitated such as by the addition of an excess of water. The copolymer is collected and dried.

Although the above process has been described in two steps, it is understood that it is within the scope of the present invention to employ one or more additional steps. Illustratively rather than a single addition of oleum to complete the copolymer formation in the second step, several additions of oleum may be employed to complete copolymer formation.

To further illustrate the present invention, the following example is provided. All percentages are by weight unless otherwise indicated. In the example, inherent viscosity is expressed as a ratio of the natural logarithm of the relative viscosity to the mass concentration of the polymer as measured with respect to a solution of 0.5 g of the polymer in 100 ml of concentrated sulfuric acid at 25° C. Relative viscosity is a ratio of the viscosity of the polymer in solution to that of the solvent expressed as time of efflux of the solution divided by the time of efflux of the solvent at constant temperature.

EXAMPLE

A polyoxadiazole copolymer was prepared by mixing 86.885 grams (0.6677 moles) hydrazine of solid hydrazine sulfate, 105.12 grams (0.6327 moles) of solid terephthalic acid, and 9.000 grams (0.0333 moles) of solid azobenzene-4,4'-dicarboxylic acid were mixed and blended together in a mixer for 30 min. To this blended mixture of solids was added a first addition of 30% Oleum, 534 grams Oleum (2.001 moles of SO3) at 25 degrees Celsius.

The mixture was mechanically stirred at 25 degrees Celsius for 15 minutes to dissolve the solids and form a solution. The solution was then heated to 120 degrees Celsius with mechanical stirring until a constant torque (constant viscosity) was observed on the mixer (60 minutes).

To this solution was added a second addition of 30% Oleum, 611 grams oleum (2.290 moles of SO3) at 130 degrees Celsius. The temperature was maintained at 130 degrees Celsius for 2 hours until the viscosity of the solution reached a plateau. The solution was then cooled to room temperature.

A small sample was removed from the cooled solution and added to water at 0 degrees Celsius to precipitate the polymer. The polymer was washed with water until a neutral pH was reached. The polymer was dried under vacuum and an inherent viscosity of 2.12 measured.

What is claimed is:

1. In a process for preparing a random copolyoxadiazole from a mixture containing oleum, hydrazine sulfate, terephthalic acid, and para-oriented aromatic diacid;
   wherein the improvement comprises oleum addition in more than one step, comprising:
   (a) combining hydrazine sulfate, terepthalic acid and para-oriented aromatic diacid,
   (b) adding to (a) oleum in an amount not greater than 3 molar equivalent of sulfur trioxide based on moles of hydrazine with temperature of the oleum controlled to not greater than 50 degrees Celsius until dissolution occurs of oleum, hydrazine sulfate, terephthalic acid, and para-oriented aromatic diacid followed by heating in a range of 100 to 150 degrees Celsius with stirring until viscosity plateaus,
   (c) adding a further amount of oleum to complete the reaction to prepare the random copolyoxadiazole.

2. The process of claim 1 wherein the total amount of sulfur trioxide is in a range from 5 to 6 molar equivalents based on the moles of hydrazine.

3. The process of claim 1 wherein hydrazine sulfate expressed as hydrazine is present in an amount from 95 to 100 mole percent in comparison to a total number of moles of terephthalic acid and at least one additional para-oriented aromatic diacid.

4. The process of claim 1 wherein terepthalic acid and at least one additional para-oriented aromatic diacid are present in an amount from 65 to 90 mole percent and 35 to 10 mole percent respectively.

5. The process of claim 1 with a solution temperature in a range from 100 to 150 degrees Celsius following dissolution.

6. The process of claim 1 wherein oleum is added in more than two steps.

7. The process of claim 1 wherein the additional para-oriented aromatic diacid comprises 4,4'-oxybis(benzoic acid).

8. The process of claim 1 wherein the additional para-oriented aromatic diacid comprises 4,4'-azobenzenedicarboxylic acid.

9. The process of claim 1 wherein the additional para-oriented aromatic diacid comprises 4,4'-stilbenedicarboxylic acid.

10. The process of claim 1 wherein the additional para-oriented aromatic diacid comprises 1,4'-phenylenediacrylic acid.

11. The process of claim 1 wherein the additional para-oriented aromatic diacid comprises 2,6-naphthalene dicarboxylic acid.

12. The process of claim 1 wherein the additional para-oriented aromatic diacid comprises 4,4'-biphenyldicarboxylic acid.

13. The process of claim 1 wherein the viscosity of the solution plateaus in step (b) in a time period after about 30 to 75 minutes of heating.

* * * * *